Patented Sept. 15, 1953

2,652,381

UNITED STATES PATENT OFFICE 2,652,381

POLYMERIC COMPOSITIONS

Costas H. Basdekis, Longmeadow, Mass., assignor to Monsanto Chemical Company, St. Louis, Mo., a corporation of Delaware No Drawing. Application August 23, 1952, Serial No. 306,063

16 Claims. (Cl. 260—41)

This invention relates to new compositions of matter comprising calcium salts of polyacrylic acids. More specifically the invention relates to new activated chemical compounds useful in inducing aggregation in agricultural soils.

In copending application, Serial No. 303,395, filed August 8, 1952, Costas H. Basdekis, there are described and claimed calcium salts of partially hydrolyzed acrylonitrile polymers and methods for their preparation by a partial hydrolysis reaction. These calcium salts of a specific degree of hydrolysis are useful soil conditioning agents, but those of more complete hydrolysis are of little value in aggregating soils. In other words, if the hydrolysis is relatively complete and the compositions have less than 24 per cent of the original nitrogen content, the compounds are too insoluble for conditioning soils. Water-solubility is a necessary characteristic of the useful polymers because the chemical and physical reaction between the polymers and the clay particles takes place in the medium of soil moisture. The compounds in the form that they are added to the soil need not be water-soluble in the usual sense, if they are formulated in such a manner as to be converted into soluble salts after incorporation in the soil.

The primary purpose of this invention is to provide a method of improving the utility of water-soluble calcium polyacrylates made by the partial hydrolysis of acrylonitrile polymers, and rendering useful as soil aggregating agents the insoluble calcium polyacrylates made by other methods. A further purpose of this invention is to provide a formulation of insoluble calcium polyacrylates so as to generate in situ water-soluble compounds with soil conditioning properties. A still further purpose of this invention is to prepare new and improved compositions of matter.

In accordance with this invention it has been found that calcium salts of polyacrylic acids and calcium salts of acrylonitrile polymers wherein at least 60 per cent of the original cyano groups have been converted by hydrolysis to and evolved from the composition as ammonia may be formulated into useful soil conditioning agents by the incorporation of certain soluble sodium compounds. For example, the addition of small amounts of sodium carbonate, sodium bicarbonate, sodium hydroxide, sodium sulfate and sodium silicate will solubilize the insoluble calcium polyacrylates and the difficultly soluble calcium salts of extensively hydrolyzed acrylonitrile polymers, and improve the soil conditioning capacity of both the insoluble and the water-soluble calcium salts, and especially the salts of hydrolyzed polyacrylonitrile. The nature and quantity of the soluble sodium salts used in the practice of this invention will depend upon the alkalinity of the soil, the solubility of the basic calcium polymer in the soil moisture, and the degree of soil aggregation desired in the soil after treatment. The salts combined with the calcium polyacrylates in accordance with this invention are not plant nutrients and all of their beneficial effect is attributable to the enhanced ability to aggregate soil.

In the practice of this invention it is preferable to use from ten to 90 per cent by weight of the sodium salt based upon the calcium ion in the basic polymeric salt. In general the optimum effects are noticeable when from 25 to 75 per cent is used. The selection of the particular sodium salts will depend upon the acidity of the soil being treated. Strongly acid soils may be aggregated with polymers modified by the addition of sodium hydroxide. Slightly acid soils may find sodium carbonate and sodium silicate more useful. The neutral sodium sulfate may be used where little change in the pH value of the soil is needed, and similarly sodium bicarbonate is of more universal application.

The new compositions are physical mixtures which have been found in some instances to be more useful than effective polymeric calcium salts unmodified, and in some instances very effective where the unmodified polymers are completely useless. These mixtures may be prepared in any kind of mixing or blending apparatus, such as that used in the fertilizing mixing industry. The dry blends are in some cases more useful than the pure polymers because of the better free-flowing characteristics of the mixtures, however other additives may be necessary to further improve the flow characteristics, if either the calcium salts of the polymers or the sodium salt modifiers have any tendency to be hygroscopic.

Further details of the new compositions and the beneficial effects achieved through their use are set forth with respect to the following specific examples. In these examples soil aggregating properties of the polymeric compositions measured by mixing a sample of soil with the said composition and determining the per cent of water-stable aggregates by a standard procedure known as wet-sieving. The treated soil is moistened with sufficient water to make the soil plastic, and soil crumbs are formed by pressing the soft mixture through a four mm. screen. After drying the soil crumbs their water-stability is measured by placing a sample on the top of a set of three sieves, 0.84 mm., 0.42 mm., and 0.25 mm., arranged in order of decreasing size. The assembly was placed in a water bath and mechanically raised and lowered through a distance of 1.5 inches at the rate of 30 cycles per minute for 30 minutes. The proportion of soil crumbs remaining on the three screens is used as a measurement of the water-stability of the soil crumbs.

*Example 1*

Various calcium salts of polyacrylic acids were prepared by polymerizing calcium acrylate, and by hydrolyzing acrylonitrile polymers with calcium hydroxide in water slurry. The hydrolysis method was used to prepare samples of a wide variety of nitrogen contents depending upon the extent of hydrolysis. All of these samples were blended with sodium carbonate in an amount equivalent to the calcium salt. The polymer mixtures and the unmodified polymeric calcium salts were each used to treat soils by incorporating in the soil 0.063 per cent by weight of the calcium salt and 0.035 per cent of sodium carbonate. The same calcium salts were modified with an equivalent of sodium hydroxide and were similarly tested.

| Polymeric Calcium Salt | Percent N | Percent CN (Hydrolyzed) | Percent Water-Stable Aggregates | | |
|---|---|---|---|---|---|
| | | | Without | With NaOH | With Na$_2$CO$_3$ |
| Prepared from Calcium Acrylate Hydrolysis | | 0 | 0.5 | | 12.5 |
| Do | 3.44 | 76.2 | 11.0 | 58.5 | 87.0 |
| Do | 3.94 | 75.2 | 37.8 | 77.3 | 84.8 |
| Do | 3.92 | 75.7 | 37.8 | 68.3 | 88 |
| Do | 4.11 | 73.6 | 57.5 | 69.8 | 86.3 |
| Do | 4.43 | 72.1 | 66 | 81.5 | 89 |
| Do | 5.04 | 68 | 57.5 | 60.5 | 86 |
| Do | 5.22 | 65 | 16.5 | | 66 |
| Do | 5.72 | 62.5 | 7.5 | | 23.3 |
| Do | 6.52 | 60.6 | 3.0 | 18.8 | 13.0 |
| Do | 11.02 | 42.2 | 0.25 | 2.8 | 1.3 |

*Example 2*

A large number of samples of a calcium salt of hydrolyzed polyacrylonitrile, prepared by hydrolysis with 75 per cent of the stoichiometric quantity of calcium hydroxide, were mixed with various proportions of different inorganic salts. The following table identifies the modifying agent, the proportion of said agent and the water-stability of aggregates in Miami Silt Loam soil treated with 0.05 per cent of the polymeric calcium salt.

| Agent | Mole Ratio Agent to Ca Salt | Percent Aggregation |
|---|---|---|
| Unmodified | | 66.0 |
| KOH | 1.0 | 52.8 |
| K$_2$CO$_3$ | 1.0 | 51.0 |
| NaOH | 1.0 | 77.5 |
| Na$_2$CO$_3$ | 1.0 | 81.8 |
| Na$_2$CO$_3$ | 0.5 | 84.5 |
| K$_2$SO$_4$ | 1.0 | 36.0 |
| Na$_2$SO$_4$ | 1.0 | 67.5 |
| (NH$_4$)$_2$SO$_4$ | 1.0 | 44.3 |
| NaCl | very poor | very poor |
| NaC$_2$H$_3$O$_2$ | do | Do. |
| KNO$_3$ | do | Do. |

The above data demonstrate the difference between the specified sodium compounds and the corresponding potassium and ammonium compounds, the latter being less effective and inducing a deleterious result as compared to the unmodified calcium salt. Similarly the chlorides, acetates and nitrates of all alkali metals greatly reduce the aggregative effect of the calcium salts. The useful sodium compounds appear to be those which, when reacted with a soluble calcium compound in aqueous solution, cause the precipitation of a relatively insoluble calcium compound.

The expression, "water-soluble," as used throughout the specification, is intended in the broad sense, and includes non-Newtonian solutions as well as the so-called "true solutions." Thus, the water-soluble polymers will include those which can be swollen by water to an infinite extent, and these are considered completely water-soluble. Other polymers which are swollen by water to a substantial but limited extent are termed "partially water-soluble." The solubility is evidenced by the capacity of polymer-water composition for aggregating soil, since the ability to adsorb on the soil and manifest a substantial increase in the proportion of water-stable aggregates therein, depends upon the hydrophilic molecular dispersibility of the polymer in the soil water, whereby polymeric ions are formed. This solubility is regarded as necessary for the diffusion of the polymer mass through the soil moisture to attain optimum soil aggregation.

What I claim is:

1. A pulverulent substantialy dry mixture of a calcium salt of a polymer of acrylic acid and a water-soluble sodium compound, which will precipitate a water-insoluble calcium salt in the presence of a water-soluble calcium compound.

2. A pulverulent substantially dry mixture of a calcium salt of a polymer of acrylic acid and a water-soluble sodium compound, which will precipitate a water-insoluble calcium salt in the presence of a water-soluble calcium compound, selected from the group consisting of sodium hydroxide, sodium carbonate, sodium bicarbonate, sodium sulfate and sodium silicate.

3. A pulverulent substantially dry mixture of a calcium salt of a hydrolyzed polymer of acrylonitrile and a water-soluble sodium compound, which will precipitate a water-insoluble calcium salt in the presence of a water-soluble calcium compound, said hydrolysis reaction having been conducted until at least 60 per cent of the original cyano groups are hydrolyzed and the nitrogen content evolved as ammonia.

4. A pulverulent substantially dry mixture of from 25 to 75 per cent by weight of a calcium salt of a polymer of acrylic acid and from 75 to 25 per cent by weight of a water-soluble sodium compound, which will precipitate a water-insoluble calcium salt in the presence of a water-soluble calcium compound.

5. A pulverulent substantially dry mixture of from 25 to 75 per cent by weight of a calcium salt of a polymer of acrylic acid and from 75 to 25 per cent of a water-soluble sodium compound, which will precipitate a water-insoluble calcium salt in the presence of a water-soluble calcium compound, selected from the group consisting of sodium hydroxide, sodium carbonate, sodium bicarbonate, sodium sulfate and sodium silicate.

6. A pulverulent substantially dry mixture of from 25 to 75 per cent by weight of a calcium salt of a hydrolyzed polymer of acrylonitrile and from 75 to 25 per cent by weight of a water-soluble sodium compound, which will precipitate a water-insoluble calcium salt in the presence of a water-soluble calcium compound, said hydrolysis reaction having been conducted until at least 60 per cent of the original cyano groups are hydrolyzed and the nitrogen content evolved as ammonia.

7. The composition defined by claim 1 wherein the sodium compound is sodium hydroxide.

8. The composition defined by claim 1 wherein the sodium compound is sodium carbonate.

9. The composition defined by claim 1 wherein the sodium compound is sodium bicarbonate.

10. The composition defined by claim 1 wherein the sodium compound is sodium sulfate.

11. The composition defined by claim 1 wherein the sodium compound is sodium silicate.

12. The composition defined by claim 3 wherein the sodium compound is sodium hydroxide.

13. The composition defined by claim 3 wherein the sodium compound is sodium carbonate.

14. The composition defined by claim 3 wherein the sodium compound is sodium bicarbonate.

15. The composition defined by claim 3 wherein the sodium compound is sodium sulfate.

16. The composition defined by claim 3 wherein the sodium compound is sodium silicate.

COSTAS H. BASDEKIS.

No references cited.